United States Patent
Wakeford et al.

(10) Patent No.: US 9,533,215 B1
(45) Date of Patent: *Jan. 3, 2017

(54) SYSTEM AND METHOD FOR PREDICTING IN-GAME ACTIVITY AT ACCOUNT CREATION

(71) Applicant: KABAM INC., San Francisco, CA (US)

(72) Inventors: Kent Wakeford, Hillsborough, CA (US); Clifford J. Harrington, San Francisco, CA (US)

(73) Assignee: Kabam, Inc., San Francisco, CA (US)

( * ) Notice: Subject to any disclaimer, the term of this patent is extended or adjusted under 35 U.S.C. 154(b) by 148 days.

This patent is subject to a terminal disclaimer.

(21) Appl. No.: 13/869,403

(22) Filed: Apr. 24, 2013

(51) Int. Cl.
*A63F 9/24* (2006.01)
*A63F 13/00* (2014.01)
*G06F 17/00* (2006.01)
*G06F 19/00* (2011.01)

(52) U.S. Cl.
CPC ..................... *A63F 13/00* (2013.01)

(58) Field of Classification Search
CPC .............................. A63F 13/79; A63F 13/795
USPC .......................................................... 463/42
See application file for complete search history.

(56) References Cited

U.S. PATENT DOCUMENTS

| | | | |
|---|---|---|---|
| 2005/0182693 A1 | 8/2005 | Alivandi | 705/27 |
| 2006/0121992 A1 | 6/2006 | Bortnik et al. | 463/43 |
| 2006/0247055 A1 | 11/2006 | O'Kelley, II et al. | 463/42 |
| 2007/0087834 A1* | 4/2007 | Moser et al. | 463/42 |
| 2008/0032787 A1 | 2/2008 | Low et al. | 463/29 |
| 2009/0075738 A1 | 3/2009 | Pearce | 463/42 |
| 2009/0210301 A1 | 8/2009 | Porter et al. | 705/14 |
| 2010/0050088 A1 | 2/2010 | Neustaedter et al. | 715/745 |
| 2010/0094841 A1 | 4/2010 | Bardwil | 707/705 |
| 2011/0014972 A1* | 1/2011 | Herrmann et al. | 463/25 |
| 2011/0045912 A1 | 2/2011 | Bortnik et al. | 463/42 |
| 2011/0092273 A1 | 4/2011 | Cerbini | 463/25 |
| 2011/0113353 A1 | 5/2011 | Koh et al. | 715/760 |
| 2011/0145040 A1 | 6/2011 | Zahn et al. | 705/7.33 |
| 2011/0275431 A1 | 11/2011 | Hirzel | |
| 2012/0042282 A1 | 2/2012 | Wong | 715/811 |
| 2012/0069131 A1 | 3/2012 | Abelow | |
| 2012/0101886 A1 | 4/2012 | Subramanian et al. | 705/14.23 |
| 2012/0142429 A1 | 6/2012 | Muller et al. | 463/42 |
| 2012/0178529 A1 | 7/2012 | Collard et al. | 463/31 |
| 2012/0197874 A1 | 8/2012 | Zatkin et al. | 707/722 |
| 2012/0264509 A1 | 10/2012 | Bortnik et al. | 463/29 |
| 2013/0116032 A1* | 5/2013 | Lutnick | 463/17 |
| 2013/0190094 A1 | 7/2013 | Ronen | |

* cited by examiner

*Primary Examiner* — Kevin Y Kim
(74) *Attorney, Agent, or Firm* — Sheppard Mullin Richter & Hampton LLP

(57) ABSTRACT

This disclosure relates to a system and methodology for dynamically adjusting a game based on predictions made during game account creation in accordance with one or more implementations. The system may be configured to receive user information included in platform level accounts which were previously created by users on an online platform and assign one or more user types to the user based on that user information. The system may be configured such that game adjustments associated with one or more user types for future play by users associated with that user type may be modified over time based on historical and ongoing game activities undertaken by users associated with one or more user types.

20 Claims, 3 Drawing Sheets

ID CREATION

FIELD OF THE DISCLOSURE

This disclosure relates to a system and method for dynamically adjusting an online game based on predictions about a user type for a user made during game account creation.

BACKGROUND

Many online games are provided through an online gaming platform like Facebook.com, Kabam.com, Zynga.com, BigPoint Games, Steam, etc. The individual games accessed through an online gaming platform automatically create user accounts that are "linked" to an over-arching platform account for the users. For example, a single platform account may be linked to a host of individual game-level accounts for the user. This enables users to "log in" through the platform, and then experience all of their games in an integrated manner.

It is known that within online games, users tend to participate in various aspects of the game and eschew others. These aspects include, for example, a collection/harvesting mechanic in which resources are collected, cultivated, manufactured, etc. Another aspect includes Player versus Player ("PvP") gameplay in which users seek to engage in competing directly with (e.g., battling) other players within the game. Yet another aspect includes Player versus Environment ("PvE") gameplay in which users seek to complete "quests" or other tasks within the game to gain points, virtual items, and/or other rewards.

Typically, users of an online game are not "classified" (e.g., into a player type) until after they have begun playing the game and have a large enough sample of use for classifications and/or predictions about future activities to be made. Users sometimes have difficulty "finding" the activities and/or features in an online game that will make them consistent users.

SUMMARY OF THE DISCLOSURE

One aspect of the disclosure relates to a system for dynamically adjusting a game based on predictions about a user type to be assigned to user and which are made during game account creation in accordance with one or more implementations. In exemplary implementations, dynamically adjusting a game based on predictions may be performed by processors executing computer program modules. In some implementations, the system may include one or more servers. The server(s) may be configured to communicate with one or more client computing platforms according to a client/server architecture. The users may access the system via the client computing platforms, for instance, to engage in one or more games.

The server(s) may be configured to execute one or more computer program modules to provide one or more games to users (or players). The computer program modules may include one or more of a game module, a game account module, a user type module, a customization module, a learning module and/or other modules. It is noted that the client computing platforms may include one or more computer program modules that are the same as or similar to the computer program modules of the server(s) to facilitate individualized content made available to the users of online games.

The game module may be configured to execute an instance of the online game to facilitate presentation of the online game to the users. The game module may be configured to implement in-game actions in the instance of the online game in response to action requests for the in-game actions from the users, wherein the users include a first user.

The game account module may be configured to create game level user accounts for users. The game account module may be configured to receive user information included in platform level accounts which were previously created by users on an online platform. The game account module may be configured such that creation of a first game level account for a first user of an online game includes receiving user information from a first platform level user account which was previously created by the first user on an online platform.

The user type module may be configured to determine user types of users based on obtained platform level account information associated with a user. The user type module may be configured to determine a first user type for the first user based on the first platform level account.

The customization module may be configured to determine customizations of content in the online game made available to the individual users through participation and/or achievement within the online game. The customization module may be configured to determine customization of content and the customizations may be designed to enhance prospective usage of the online game by the user. The customization module may determine customizations at the time of game level user account creation based on user information received from a platform level user account associated with the user and/or based on a user type assigned to the user based on the user information.

The customization module may be configured to determine the customizations for the users based on the user types assigned to the users such that the determination of the first customization for the first user is determined based on the first user type for the first user. The customization may affect various aspects of game play which are dynamically implemented in-game. These customizations may include at least one of a user interface, the presence or absence of content available for unlocking, reward and/or discovery, virtual item packages available (and/or given away), pointers to game content as well as other in-game characteristics.

In certain implementations, user types may include a collection and harvesting type preferring at least one of resource collection, resource cultivation and resource manufacturing, a player versus player type, preferring competition with other users within the online game (e.g., battling, first person shooters), and/or a player versus environment type preferring completing quests.

The learning module may be configured to modify customizations associated with one or more user types to be implemented in online games when played by users associated with those user types. In certain implementations, historical and ongoing in-game activities as undertaken by users associated with one or more user types are monitored and used to modify customizations to be associated with these user types for game play in the future by users associated with these user types.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural references unless the context clearly dictates otherwise.

DETAILED DESCRIPTION

Figure 1:
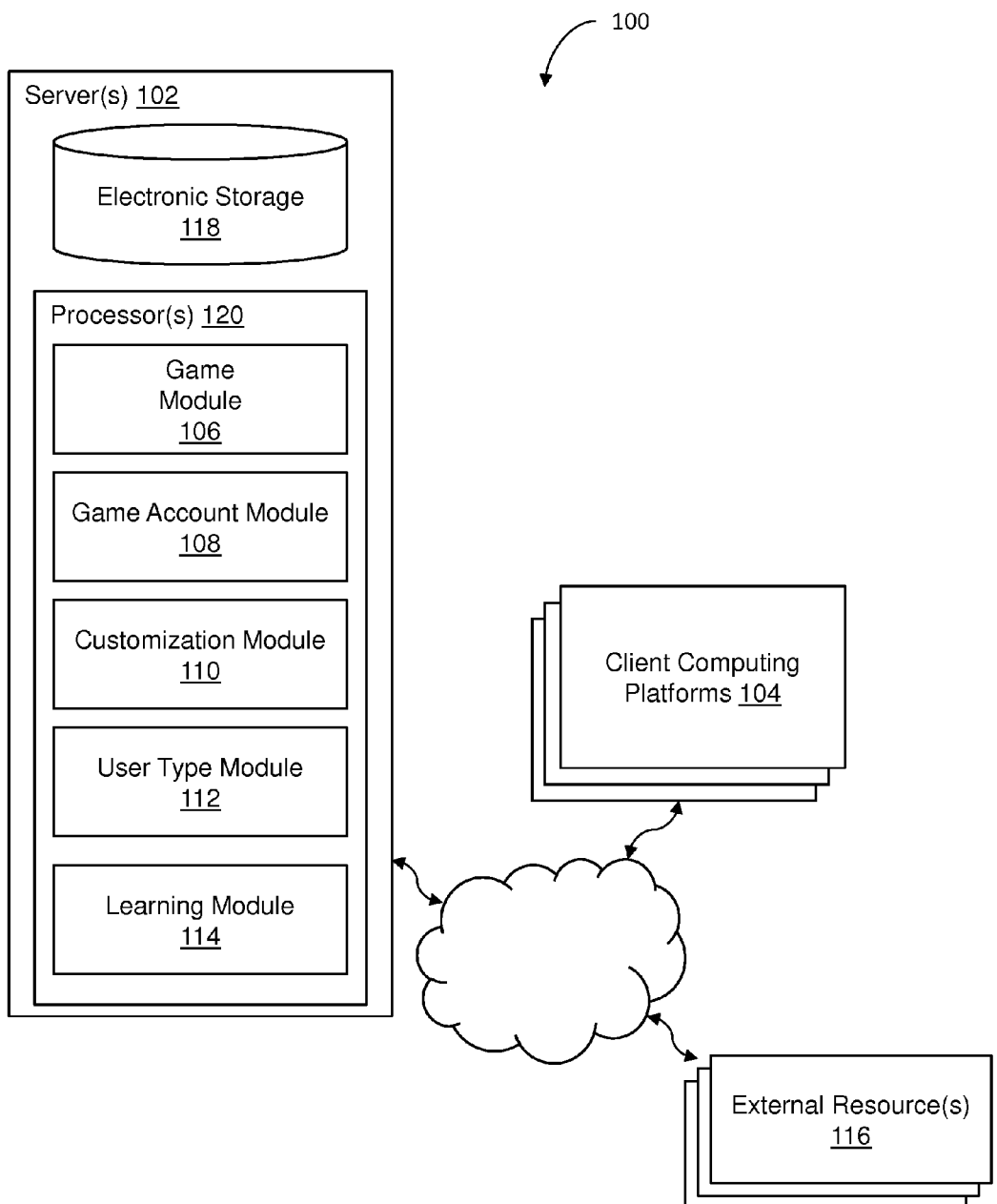
FIG. 1 illustrates a system for dynamically adjusting a game based on predictions made at the time of game account creation and the assignment of a user type to a user, in accordance with one or more implementations.

FIG. 1 illustrates a system 100 configured to provide a virtual space. System 100 is only one example of a suitable computing environment and is not intended to suggest any limitation as to the scope of use or functionality of the features described herein. Providing the virtual space may include hosting the virtual space over a network.

In this disclosure, aspects of an online game that a user most enjoys may be identified, and various game characteristics may be adjusted based on user information available through a platform level account associated with a user. Accordingly, embodiments may be configured for adjustment of one or more user interfaces, adjustment to the availability of content, adjustment to the availability of virtual item packages as well as modification of pointers to game content resulting in a virtual game that may provide more engaging and immersive in-game experiences.

In some implementations, system 100 may include one or more servers 102. The server 102 may be configured to communicate with one or more client computing platforms 104 according to a client/server architecture. The users may access system 100 and/or the virtual space via client computing platforms 104, for instance, to engage in one or more games.

The server(s) 102 may be configured to execute one or more computer program modules. The computer program modules may include one or more of a game module 106, a game account module 108, a customization module 110, a user type module 112, a learning module 114 and/or other modules. As noted, the client computing platform(s) 104 may include one or more computer program modules that are the same as or similar to the computer program modules of the server(s) 102 to facilitate in-game actions.

The game module 106 may be configured to execute an instance of a game to facilitate presentation of the game to users. The game module 106 may be configured to implement in-game actions in the instance of the game, in response to action requests for the in-game actions by the users.

The game may be provided via a virtual space, and may include a plurality of resource types and/or maps. An instance of the virtual space may be executed by computer modules to determine views of the virtual space. The views may then be communicated (e.g., via streaming, via object/position data, and/or other information) from server(s) 102 and/or sources to client computing platforms 104 for presentation to users. The view determined and transmitted to a given client computing platform 104 may correspond to a location in the virtual space (e.g., the location from which the view is taken, the location the view depicts, and/or other locations), a zoom ratio, a dimensionality of objects, a point-of-view, and/or view parameters. One or more of the view parameters may be selectable by the user.

The instance of the virtual space may comprise a simulated space that is accessible by users via clients (e.g., client computing platform(s) 104) that present the views of the virtual space to a user. The simulated space may have a topography, express ongoing real-time interaction by one or more users, and/or include one or more objects positioned within the topography that are capable of locomotion within the topography. In some instances, the topography may be a 2-dimensional topography. In other instances, the topography may be a 3-dimensional topography. The topography may include dimensions of the space, and/or surface features of a surface or objects that are "native" to the space. In some instances, the topography may describe a surface (e.g., a ground surface) that runs through at least a substantial section of the space. In some instances, the topography may describe a volume with one or more bodies positioned therein (e.g., a simulation of gravity-deprived space with one or more celestial bodies positioned therein). The instance executed by the computer modules may be synchronous, asynchronous, and/or semi-synchronous.

The above description of the manner in which views of the virtual space are provided is not intended to be limiting. The virtual space may be expressed in a more limited, or more rich, manner. For example, views determined for the virtual space may be selected from a limited set of graphics depicting an event in a given place within the virtual space. The views may include additional content (e.g., text, audio, pre-stored video content, and/or other content) that describes particulars of the current state of the place, beyond the relatively generic graphics. For example, a view may include a generic battle graphic with a textual description of the opponents to be confronted. Other expressions of individual places within the virtual space are contemplated.

Within the instance(s) of the virtual space, users may control characters, objects, simulated physical phenomena (e.g., wind, rain, earthquakes, and/or other phenomena), and/or other elements within the virtual space to interact with the virtual space and/or each other. The user characters may include avatars. As used herein, the term "user character" may refer to an object (or group of objects) present in the virtual space that corresponds to an individual user. The user character may be controlled by the user with which it is associated.

User-controlled element(s) may move through and interact with the virtual space (e.g., non-user characters in the virtual space, other objects in the virtual space). The user-controlled elements controlled by and/or associated with a given user may be created and/or customized by the given user. The user may have an "inventory" of virtual goods and/or currency (e.g., resources of the plurality of resource types) that the user can use (e.g., by manipulation of a user character or other user-controlled element, and/or other items) to perform in-game actions within the virtual space.

The users may participate in the instance of the virtual space by controlling one or more of the available user-controlled elements in the virtual space. Control may be exercised through control inputs and/or commands input by the users through client computing platforms 104. The users may interact with each other through communications exchanged within the virtual space. Such communications may include one or more of textual chat, instant messages, private messages, voice communications, and/or other communications. Communications may be received and entered by the users via their respective client computing platforms 104. Communications may be routed to and from the appropriate users through server(s) 102. In implementations, the game module 106 may also be configured to implement the customizations determined for the individual users.

The game account module 108 may be configured to obtain user information associated with platform level user accounts which are used to predict desirable game characteristics to be dynamically implemented in an online game for the user. In implementations, game account module 108 is also configured to create a game level account to be associated with a user with respect to a specific online game. User information which is obtained from a platform level account and which is used to predict desirable customizations for a user or group of users may include information about the users that has some value in predicting their preferred styles of gameplay. Examples include demographic and geographic information, device type, interests, activity in other online games, and information about associated users and relationships therewith, in addition to subjective ratings and affinities (e.g. likes and dislikes), membership in social groups, education level, gender, age and other parameters with respect to users.

The customization module 110 may be configured to determine customizations of characteristics in the online game made available to the individual users through participation and/or achievement within the online game. The customizations may derive from user information available in a platform level account as well as assigned user types and are designed to enhance prospective usage of the online game by the users.

Customized content may include content that is provided to a user when performing in-game actions such as exploring a map, researching a technology or skill, purchasing an in-game item, and/or completing an in-game achievement. Such content may include at least one of in-game items, in-game powers, in-game skills, in-game technologies, in-game pets, in-game transportation units, in-game units, and in-game buildings. Thus, for example, in implementations a user identified as preferring resource collection may be able to select resource-collecting powers and skills when leveling up or otherwise advance in the online game, to receive resource collection-related items when defeating enemies or completing quests, to be able to purchase resource collection-related items, pets, units and/or buildings, and/or to research better resource collection technologies, which are not available or are less available to other types of users, For example, such a user might be able to purchase such items at reduced cost, develop such skills/abilities at a faster rate, etc., than for users identified as preferring player versus player or player versus environment activity. Such customizations may improve gameplay for the user, and may actually encourage the user to try other areas of gameplay in order to obtain helpful items, etc. for improved resource collection (e.g. by completing a quest).

In some implementations, items, etc. useful for other aspects of gameplay the user is identified as being less interested in may be provided to the user preferentially. For example, powerful player versus player items might drop when the user that prefers resource collection defeats enemies, enabling the user to compete in and perhaps enjoy player versus player competitions without investing more time than desired.

In some implementations, other aspects of game interaction may be customized based on predictions generated from platform level account data. These include, in one implementation, modifications of a user interface. In this case, the user interface is modified to enhance discovery of opportunities for the kind of gameplay it is predicted that the user will enjoy and/or so that the user can be more efficient for the associated type of gameplay. The types of modifications that may be implemented include changing selectable fields (e.g. button) parameters such as size, color, position and others. The changes can be made to make the user interface more efficient for the type of gameplay that the user is predicted to enjoy.

In some implementations, customizations may involve the availability (or lack thereof) of content available for unlocking, reward and/or discovery. The content available for unlocking, discovery or winning within the game may be adjusted by the system of the present invention. This content may be obtained by the user through discovery (e.g., exploring a map, in-game research of techs or skills only available to certain users, and/or other discovery), unlocking (e.g., through purchase), or achievement (e.g., reward for a quest, an item drop for a boss kill, other PvE activities). The content may include virtual items, powers, skills, technologies, virtual pets, mounts (e.g., animals, vehicles, vessels, etc.), buildings, and/or other content. The content may enhance performance and/or enjoyment of the types of gameplay it is predicted the user will enjoy.

In some implementations, customizations may involve the availability (or lack thereof) of virtual items packages for use or to be given away. The bundles or packages of virtual items available to the user may be adjusted based on predicted gameplay. These may include adjusting the bundles available for purchase in the store for the game, and/or a bundle being provided to the user at the beginning of gameplay. These adjustments may also include the items included together, the prices of items and other related characteristics. These characteristics can be tuned to take advantage of less cost sensitivity for an activity the user really enjoys and/or to coax the user to attempt other types of activities in the game. The system may re-order pre-existing bundles in the display of the store, have pre-formed bundles with one or two slots that are left open to be filled based on this determination, or select items for the bundle entirely based on the type of gameplay preferred.

In some implementations, customizations may involve modifying pointers to game content based on predicted user preferences. The pointers may be modified to direct the user to gameplay it is predicted he will enjoy. Modification of the pointers may include, for example, changing elements on a map to provide guidance to specific opportunities such as opportunities not available to users that enjoy other activity types and/or highlighting activities that are available to all. Pointers may also be modified such that non-player characters can provide different guidance based on predicted user preferences and/or Pop-ups directing the user to content can be adjusted based on predicted user preferences.

In some implementations, customizations may be assigned specifically based upon one or more user types to which the user is assigned as such assignment is made by user type module 112. Each user type may be associated with one or more customizations to be made during gameplay. For example, if a user is assigned to a player versus player preference user type, customizations and content may be specifically tailored for those preferences for all users which are assigned to that user type. In some implementations, users may be re-assigned to different user types based on user activities occurring after initial assignment to one or more user types. Further, as discussed herein, customizations and content associated with each user type may be modified over time as individual and group preferences for each user type are better determined over time based on individual and aggregate user activities occurring after customizations and content for each user type are originally determined.

The user type module 112 is configured to determine user types of users based on information obtained from platform account information. The customization for the users may be based on the determined user types. The user type may be further comprised of at least one of the following: 1) a collection or harvesting type preferring at least one of resource collection, resource cultivation and resource manufacturing; 2) a player versus player type, preferring competing with other users within the online game; and 3) a player versus environment type preferring completing quests.

In some implementations, various parameters associated with a user that are obtained from the platform at account creation are used to assign one or more user types to a user. These parameters may include, for example, one or more geographic locations (e.g., region, location, etc.) associated with the user, the user's relationships with other users on the platform (e.g., social graph), other games played by the user through the platform, education, gender, age, subjective ratings or affinities (e.g., "likes"), social groups on the platform, and/or other information. The foregoing information, either individually, through combinations of parameters and/or using an aggregate mix of all parameters, is processed to determine one or more user types to which the applicable user may be assigned. User type affiliations may be assigned by priority, such that users may have a primary type affiliation as well as one or more secondary, tertiary, etc. affiliations. In this way, customizations for game play can be prioritized based on the "weight" of the assigned user type. Further, the system of the invention may use one or more groupings of parameters, possibly assigning weights to each of those parameters to determine the most applicable user type(s) to which the user should be assigned.

Learning module 114 is included in some implementations and is configured to periodically update customizations and content which are associated with defined user types. In some implementations, learning module 114 monitors game play and other user activities of users assigned to one or more user types and adjusts customizations and/or content which are associated with each user type over time based on learned preferences for users associated with the applicable user type(s). For example, if users assigned to a "likes quests" user type begin to demonstrate an affinity for specific virtual items as opposed to being less enthused about other virtual items, then learning module 114 may direct customization module 110 to more prominently display those desirable virtual items whenever a user assigned to the "likes quests" user type is interacting with a game.

In some implementations, learning module 114 may employ historical data for users already in a game as well as overall game preferences of users associated with a specific user type to adjust desirable customizations for all users assigned to that user type when such a user engages in future gaming activity. Processing by learning module 114 and "tuning" of customizations may occur with respect to individual games, groups of games or for all games.

In some implementations, server(s) 102, client computing platforms 104, and/or external resources 116 may be operatively linked via one or more electronic communication links. For example, such electronic communication links may be established, at least in part, via a network such as the Internet and/or other networks. The network may be a wired or wireless network such as the Internet, an intranet, a LAN, a WAN, a cellular network or another type of network. It will be understood that the network may be a combination of multiple different kinds of wired or wireless networks. It will be appreciated that this is not intended to be limiting, and that the scope of this disclosure includes implementations in which server(s) 102, client computing platforms 104, and/or external resources 116 may be operatively linked via some other communication media.

A given client computing platform 104 may include one or more processors configured to execute computer program modules. The computer program modules may be configured to enable an expert or user associated with the given client computing platform 104 to interface with system 100 and/or external resources 116, and/or provide other functionality attributed herein to client computing platforms 104. By way of non-limiting example, the given client computing platform 104 may include one or more of a desktop computer, a laptop computer, a handheld computer, a tablet computing platform, a NetBook, a smartphone, a gaming console, and/or other computing platforms.

External resources 116 may include sources of information, hosts and/or providers of virtual environments outside of system 100, external entities participating with system 100, and/or other resources. In some implementations, some or all of the functionality attributed herein to external resources 116 may be provided by resources included in system 100.

Server 102 may include electronic storage 118, one or more processors 120, and/or other components. Server 102 may include communication lines, or ports to enable the exchange of information with a network and/or other computing platforms. Illustration of server 102 in FIG. 1 is not intended to be limiting. Server 102 may include a plurality of hardware, software, and/or firmware components operating together to provide the functionality attributed herein to server 102. For example, server 102 may be implemented by a cloud of computing platforms operating together as server 102.

Electronic storage 118 may comprise non-transitory storage media that electronically stores information. The electronic storage media of electronic storage 118 may include one or both of system storage that is provided integrally (i.e., substantially non-removable) with server 102 and/or removable storage that is removably connectable to server 102 via, for example, a port (e.g., a USB port, a firewire port, etc.) or a drive (e.g., a disk drive, etc.). Electronic storage 118 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 118 may include one or more virtual storage resources (e.g., cloud storage, a virtual private network, and/or other virtual storage resources). Electronic storage 118 may store software algorithms, information determined by processor 120, information received from server 102, information received from client computing platforms 104, and/or other information that enables server xx to function as described herein.

Processor(s) 120 is configured to provide information processing capabilities in server 102. As such, processor 120 may include one or more of a digital processor, an analog processor, a digital circuit designed to process information, an analog circuit designed to process information, a state machine, and/or other mechanisms for electronically processing information. Although processor 120 is shown in FIG. 1 as a single entity, this is for illustrative purposes only. In some implementations, processor 120 may include a plurality of processing units. These processing units may be physically located within the same device, or processor 120 may represent processing functionality of a plurality of devices operating in coordination. The processor 120 may be configured to execute modules 106, 108, 110, 112 and 114. Processor 120 may be configured to execute modules 106, 108, 110, 112 and 114 by software; hardware; firmware; some combination of software, hardware, and/or firmware; and/or other mechanisms for configuring processing capabilities on processor 120. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 106, 108, 110, 112 and 114 are illustrated in FIG. 1 as being implemented within a single processing unit, in implementations in which processor 120 includes multiple processing units, one or more of modules 106, 108, 110, 112 and 114 may be implemented remotely from the other modules. The description of the functionality provided by the different modules 106, 108, 110, 112 and 114 described below is for illustrative purposes, and is not intended to be limiting, as any of modules 106, 108, 110, 112 and 114 may provide more or less functionality than is described. For example, one or more of modules 106, 108, 110, 112 and 114 may be eliminated, and some or all of its functionality may be provided by other ones of modules 106, 108, 110, 112 and 114. As another example, processor 120 may be configured to execute one or more additional modules that may perform some or all of the functionality attributed below to one of modules 106, 108, 110, 112 and 114.

Figure 2:
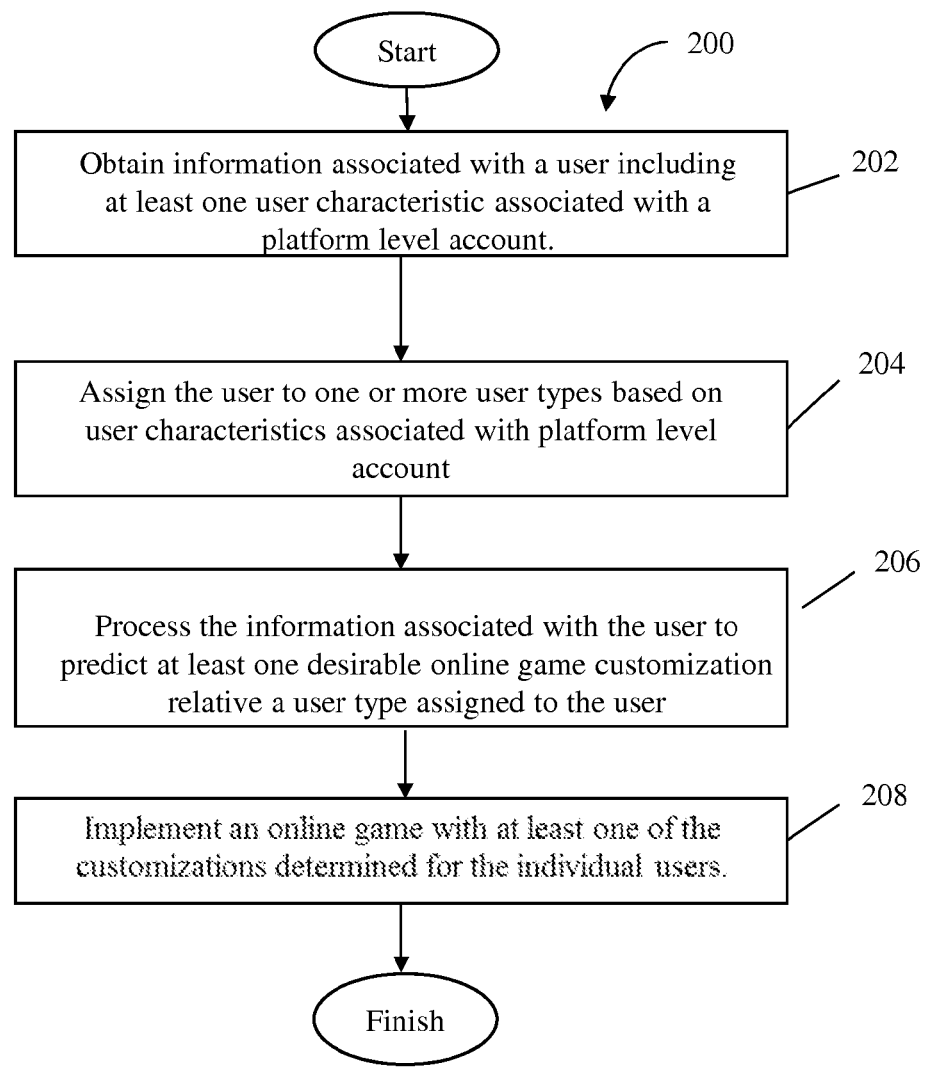
FIG. 2 illustrates a method for dynamically adjusting a game based on predictions made at the time of game account creation and the assignment of a user type to a user, in accordance with one or more implementations.

FIG. 2 illustrates a method for dynamically adjusting a game based on predictions made at the time of game account creation and the assignment of a user type to a user, in accordance with one or more implementations. The operations of method 200 presented below are intended to be illustrative. In some embodiments, method 200 may be accomplished with one or more additional operations not described, and/or without one or more of the operations discussed. Additionally, the order in which the operations of method 200 are illustrated in FIG. 2 and described below is not intended to be limiting.

In some embodiments, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

At an operation 202, information associated with a user including at least one user characteristic is obtained from a platform level account associated with the user. This information may include, for example, one or more geographic locations associated with the user, information relative to the user's relationships with other users on the platform (e.g., social graph), other games played by the user through the platform, the user's education/gender/age, subjective ratings or affinities (e.g., "likes") associated with the user, social groups on the platform to which the user belongs, and/or other information associated with the user.

At an operation 204, based on the information received as a result of operation 202, the user is assigned to one or more user types. As discussed above, in some implementations, a user may be assigned to multiple user types which collectively dictate the customizations made available to the user during gameplay. Further, in some implementations, user types may be assigned priorities so that higher priority user types take precedence when it comes to conflicting customizations or content expected to be desirable for a user. Operation 204 may be performed by a user type module that is the same or similar to user type module 112, in accordance with one or more implementations.

At an operation 206, the information associated with the user is processed to predict at least one desirable online game customization predicted to be desirable to the user based on one or more user types to which the user is assigned. Operation 206 may be performed by a customization module that is the same or similar to customization module 110, in accordance with one or more implementations.

At an operation 208, an instance of an online game may be executed to facilitate presentation of the game to users. The game, for instance, may include parameters including a size and/or type of virtual space the game will be played on, the number of players, resource types, user-controlled elements, and/or buildings initially allocated to users. In implementations, other customizations are also possible. For example, one or more user interfaces may be adjusted based on predicted user preferences. As another example, content available for unlocking, reward and/or discovery may be modified based on predicted user preferences. As yet another example, virtual item packages available and/or given away may be adjusted based on predicted user preferences. Other customizations are also possible based on predictions made which are in turn based on user characteristics determined from platform level account information. Operation 208 may be performed by a game module that is the same as or similar to game module 106, in accordance with one or more implementations.

Modifications to one or more user interfaces may be made to (1) enhance discovery of opportunities for kind of gameplay it is predicted that a user will enjoy, and/or (2) make the user more efficient for the applicable type of gameplay. The types of modifications that may be made include, for example, changing selectable field (e.g., "button") parameters such as size, color, position, etc.

Modifications to content available for unlocking, reward and/or discovery may also be made. This content may be obtained by the user through discovery (e.g., exploring a map, in-game research of techs or skills only available to certain users, and/or other discovery), unlocking (e.g., through purchase), or achievement (e.g., reward for a quest, an item drop for a boss kill, other PvE activities). The content may include virtual items, powers, skills, technologies, virtual pets, mounts (e.g., animals, vehicles, vessels, etc.), buildings, and/or other content. The content may enhance performance and/or enjoyment of the types of gameplay it is predicted the user will enjoy.

In implementations, the bundles or packages of virtual items available to the user may be adjusted based on predicted gameplay. These may include adjusting bundles available for purchase in the store for the game, and/or one or more bundles being provided to the user at the beginning of gameplay.

Pointers to game content may also be modified to direct the user to gameplay for which it is predicted that the user will enjoy. Modification of the pointers may include: changing elements on a map to provide guidance to specific opportunities which may include opportunities not available to users that enjoy other activity types and/or highlighting activities that are available to all. Other examples include non-player characters providing different guidance based on predicted user preferences and pop-ups directing the user to differing content based on predicted user preferences.

Figure 3:
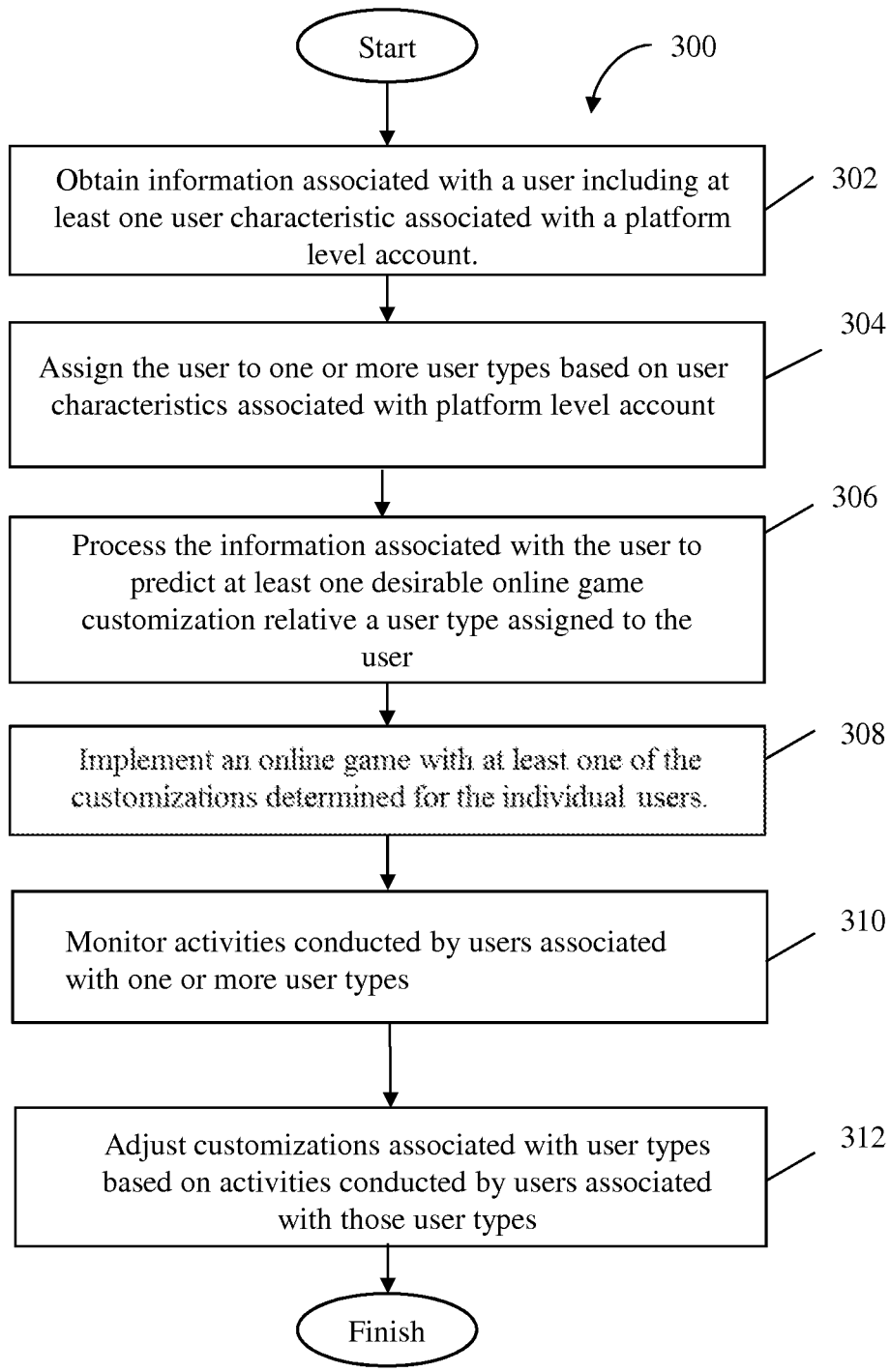
FIG. 3 illustrates a method for modifying customizations to be applied to an online game based on historical and ongoing game activities and preferences of one or more users assigned to a defined user type, in accordance with one or more implementations.

FIG. 3 illustrates a method for modifying customizations to be applied to an online game based on historical and ongoing game activities and preferences of one or more users assigned to a defined user type, in accordance with one or more implementations. The operations of method 300 presented below are intended to be illustrative. In some embodiments, method 300 may be accomplished with one or more additional operations not described, and/or without one or more of the operations discussed. Additionally, the order in which the operations of method 300 are illustrated in FIG. 3 and described below is not intended to be limiting.

In some embodiments, method 300 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 300 in response to instructions stored electronically on an electronic storage medium. The one or more processing devices may include one or more devices configured through hardware, firmware, and/or software to be specifically designed for execution of one or more of the operations of method 300.

At operation 302, information associated with a user including at least one user characteristic is obtained from a platform level account associated with the user. This information may include, for example, one or more geographic locations associated with the user, information relative to the user's relationships with other users on the platform (e.g., social graph), other games played by the user through the platform, the user's education/gender/age, subjective ratings or affinities (e.g., "likes") associated with the user, social groups on the platform to which the user belongs, and/or other information associated with the user.

At operation 304, based on the information received as a result of operation 302, the user is assigned to one or more user types. As discussed above, in some implementations, a user may be assigned to multiple user types which collectively dictate the customizations made available to the user during gameplay. Further, in some implementations, user types may be assigned priorities so that higher priority user types take precedence when it comes to conflicting customizations or content expected to be desirable for a user. Operation 304 may be performed by a user type module that is the same or similar to user type module 112, in accordance with one or more implementations.

At operation 306, the information associated with the user is processed to predict at least one desirable online game customization predicted to be desirable to the user based on one or more user types to which the user is assigned. Operation 306 may be performed by a customization module that is the same or similar to customization module 110, in accordance with one or more implementations.

At operation 308, an instance of an online game may be executed to facilitate presentation of the game to users. The game, for instance, may include parameters including a size and/or type of virtual space the game will be played on, the number of players, resource types, user-controlled elements, and/or buildings initially allocated to users. In implementations, other customizations are also possible. For example, one or more user interfaces may be adjusted based on predicted user preferences. As another example, content available for unlocking, reward and/or discovery may be modified based on predicted user preferences. As yet another example, virtual item packages available and/or given away may be adjusted based on predicted user preferences. Other customizations are also possible based on predictions made which are in turn based on user characteristics determined from platform level account information. Operation 308 may be performed by a game module that is the same as or similar to game module 106, in accordance with one or more implementations.

At operation 310, game activities of users are monitored on an ongoing basis. For all or some of users assigned to a defined user type, activities such as game preferences, desirable content (e.g. content which has been "clicked on" by users), which games are played, ratings, affiliations and other characteristics associated with these users over time, are monitored and tracked.

At operation 312, the results from operation 310 are used to modify the customizations associate with relevant user types based on ongoing monitoring of activities conducted by users assigned to those user types. Various implementations for this feature are possible. For example, a base level trigger (i.e. minimum level of changes to expected activities) could be implemented so that customizations associated with user types are only made after a substantial deviation from expected behavior occurs. In some implementations, activities conducted by certain users (e.g. more active users, less active users, users that play only specific games, etc.) could be given more weight in determining modifications to customizations associated with user types.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. An online gaming system allowing for customizable interaction, the system comprising:

one or more processors configured by machine-readable instructions to:

execute an instance of an online game, and to use the instance of the online game to effectuate transmission over a network of game state information derived from the instance of the online game to facilitate presentation of views of the online game to users on client computing platforms associated with the users, such that the users participate in user-selected ones of multiple different activities available within the online game through the views presented on the client computing platforms;

create game level user accounts for the users of the online game, wherein the creation of the game level user accounts includes receiving user information included in platform level user accounts previously created by the users on an online platform, and creation of a first game level account for a first user of the online game includes receiving user information in a first platform level user account previously created by the first user on the online platform;

predict user types of the users at the time of game level user account creation based on received user information from platform level user accounts such that a first user type for the first user is predicted at the time of creation of the first game level user account based on the received information from the first platform level user account, wherein user types classify users on a basis of preferred activities within the game such that users are classified as being of the first user type on the basis of preferring a first set of activities within the game, the first set of activities within the game being different than a second set of activities within the game preferred by a second user type;

determine customizations of the online game for individual ones of the users based on the user types predicted for the individual ones of the users such that a first customization of the online game is determined for the first user based on the prediction of the first user type for the first user; and adjust the instance of the online game to reflect the customizations of the online game determined for the individual ones of the users such that game state information derived from the instance of the online game reflects the customizations.

2. The system of claim 1 wherein the one or more processors are further configured by machine-readable instructions to assess historical activities participated in by the users of the different user types, and to predict activities the users will participate in within the game based on the activities historically participated in within the game by the users of the different user types.

3. The system of claim 2 wherein the one or more processors are further configured by machine-readable instructions to modify customizations of the online game which are desirable to the users associated with said first user type based on the activities historically participated in within the game by users of the first user type.

4. The system of claim 1 wherein user information comprising one or more of geographic location of the user, social graph information, user education level and user gender is further employed to predict at least one user type for users.

5. The system of claim 1 wherein user information comprising the type of device employed by the user for interaction with said online gaming system is further employed to predict at least one user type for users.

6. The system of claim 1 wherein user information comprising one or more of user likes, user age and user participation in one or more online groups is further employed to predict at least one user type for users.

7. The system of claim 1 wherein user information comprising information reflecting the user's relationship with at least one other user of the online game is further employed to predict at least one user type for users.

8. The system of claim 1 wherein user information comprising information reflecting the user's relationship with at least one other user of the online platform is further employed to predict at least one user type for users.

9. The system of claim 1 wherein the one or more processors are further configured by machine-readable instructions to modify the user type assigned to the first user after game account creation in response to game activities engaged in by the first user after game account creation.

10. A computer-implemented method for an online game allowing customizable interaction based upon user selection of at least one user characteristic, the method being implemented in a computer system that includes one or more physical processors and storage media storing machine-readable instructions, the method comprising:

executing an instance of an online game, and using the instance of the online game to effectuate transmission over a network of game state information derived from the instance of the online game to facilitate presentation of views of the online game to users on client computing platforms associated with the users, such that the users participate in user-selected ones of multiple different activities available within the online game through the views presented on the client computing platforms;

creating game level user accounts for the users of the online game, wherein the creation of the game level user accounts includes receiving user information included in platform level user accounts previously created by the users on an online platform, and creation of a first game level account for a first user of the online game includes receiving user information in a first platform level user account previously created by the first user on the online platform;

predicting user types of the users at the time of game level user account creation based on received user from platform level user accounts such that a first user type for the first user is predicted at the time of creation of the first game level user account based on the received information from the first platform level user account, wherein user types classify users on a basis of preferred activities within the game such that users are classified as being of the first user type on the basis of preferring a first set of activities within the game, the first set of activities within the game being different than a second set of activities within the game preferred by a second user type;

determining customizations of the online game for individual ones of the users based on the user types predicted for the individual ones of the users such that a first customization of the online game is determined for the first user based on the prediction of the first user type for the first user; and adjusting the instance of the online game to reflect the customizations of the online game determined for the individual ones of the users such that game state information derived from the instance of the online game reflects the customizations.

11. The method of claim 10 further comprising modifying the at least one game customization desirable to the first user associated with the first user type based on the activities historically participated in within the game by users of the first user type.

12. The method of claim 10 wherein the information associated with a user is obtained at the time that the user creates an account.

13. The method of claim 10 wherein the information associated with a user is obtained, at least in part, after the user creates an account.

14. The method of claim 10 wherein the at least one user characteristic employed to assign the first user to the first user type comprises one or more of geographic location, user gender, user likes, user age, and user education level.

15. The method of claim 10 wherein the at least one user characteristic employed to assign the first user to the first user type comprises the type of device employed by said user for interaction with said online game.

16. The method of claim 10 wherein the first user characteristic employed to assign the first user to the at least one user type comprises information reflecting a user's relationship with at least one other user of the game.

17. The method of claim 10 further comprising monitoring the game activity preferences of other users assigned to the first user type of the first user and in response thereto, modifying the game activity preferences associated with the first user type.

18. The method of claim 17 wherein the modified game activity preferences are implemented as at least one associated customization of the game for all users assigned to the first user type.

19. The method of claim 10 wherein the first user type assigned to the first user is selectively changeable after game account creation in response to game activities engaged in by the first user after game account creation.

20. The system of claim 1, wherein first set of activities within the game are:
 resource collection, resource cultivation and resource manufacturing activities,
 player versus player type activities, or
 player versus environment type activities.

* * * * *